United States Patent
Sedlar et al.

(10) Patent No.: US 8,398,089 B2
(45) Date of Patent: Mar. 19, 2013

(54) RADIAL SHAFT SEAL, RADIAL SHAFT SEAL ASSEMBLY AND METHOD OF INSTALLATION

(75) Inventors: Brent R. Sedlar, Ann Arbor, MI (US); David M. Toth, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 413 days.

(21) Appl. No.: 12/695,534

(22) Filed: Jan. 28, 2010

(65) Prior Publication Data
US 2010/0187769 A1 Jul. 29, 2010

Related U.S. Application Data

(60) Provisional application No. 61/147,938, filed on Jan. 28, 2009, provisional application No. 61/226,368, filed on Jul. 17, 2009.

(51) Int. Cl.
*F16J 15/32* (2006.01)
(52) U.S. Cl. ........................ 277/561; 277/549
(58) Field of Classification Search .............. 277/549, 277/559, 560, 561, 562
See application file for complete search history.

(56) References Cited

U.S. PATENT DOCUMENTS

| | | | |
|---|---|---|---|
| 2,635,907 A | 4/1953 | Heimbuch | |
| 2,736,586 A | 2/1956 | Riesing | |
| 2,743,497 A | 5/1956 | Foss | |
| 3,941,396 A | 3/1976 | Bailey et al. | |
| 4,021,049 A | 5/1977 | Phelphs et al. | |
| 4,274,641 A | 6/1981 | Cather, Jr. | |
| 4,449,717 A | 5/1984 | Kitawaki et al. | |
| 4,588,195 A | 5/1986 | Antonini et al. | |
| 4,721,314 A | 1/1988 | Kanayama et al. | |
| 4,844,484 A | 7/1989 | Antonini et al. | |
| 4,940,248 A | 7/1990 | Kilthau et al. | |
| 4,968,044 A | 11/1990 | Petrak | |
| 5,522,600 A * | 6/1996 | Duckwall | 277/402 |
| 6,601,855 B1 | 8/2003 | Clark | |
| 6,866,271 B2 | 3/2005 | MacDonald | |
| 6,921,080 B2 | 7/2005 | Johnen | |
| 7,134,669 B2 | 11/2006 | Uhrner | |
| 7,182,346 B2 | 2/2007 | Yamamoto et al. | |
| 7,458,586 B2 | 12/2008 | Salameh | |
| 7,464,942 B2 | 12/2008 | Madigan | |
| 2003/0006563 A1 | 1/2003 | Cater et al. | |
| 2004/0124587 A1 | 7/2004 | Yamamoto | |

(Continued)

FOREIGN PATENT DOCUMENTS

| | | |
|---|---|---|
| DE | 3612420 | 10/1987 |
| DE | 3613220 | 10/1987 |

(Continued)

*Primary Examiner* — Gilbert Lee
(74) *Attorney, Agent, or Firm* — Robert L. Stearns; Dickinson Wright, PLLC

(57) ABSTRACT

A radial shaft seal configured for receipt in a housing and about a shaft to sealingly isolate an air side of the seal from an oil side of the shaft seal is provided. The seal includes a mounting portion and a seal lip having an annular sealing surface extending between an oil side end and a free air side end. An annular bridge is connected to the oil side end of the seal lip by a first hinge and to the mounting portion by a second hinge. The bridge extends from the first hinge to the second hinge in radially overlying relation to the seal lip. An annular projection extends from the mounting portion axially away from the bridge. The projection has an oil side facing the seal lip and confronts the air side end of the seal lip upon the seal lip pivoting about the first hinge.

17 Claims, 2 Drawing Sheets

U.S. PATENT DOCUMENTS

| | | |
|---|---|---|
| 2005/0012277 A1 | 1/2005 | Adrion et al. |
| 2006/0103075 A1 | 5/2006 | Zahn |
| 2008/0203673 A1* | 8/2008 | Kanzaki et al. ............... 277/402 |
| 2008/0217865 A1 | 9/2008 | Sedlar et al. |
| 2008/0284110 A1 | 11/2008 | Dahlheimer |
| 2008/0309024 A1 | 12/2008 | vom Schemm |
| 2010/0133758 A1* | 6/2010 | Kanzaki et al. ............... 277/561 |
| 2010/0187768 A1* | 7/2010 | Sedlar et al. ................... 277/561 |

FOREIGN PATENT DOCUMENTS

| | | |
|---|---|---|
| EP | 1837562 A1 * | 9/2007 |
| JP | WO 9008273 | 7/1990 |
| JP | 04-107580 U | 9/1992 |
| JP | 2003-269616 A | 9/2003 |
| JP | 2006-226489 A | 8/2006 |
| JP | 2008-075679 A | 4/2008 |

* cited by examiner

RADIAL SHAFT SEAL, RADIAL SHAFT SEAL ASSEMBLY AND METHOD OF INSTALLATION

CROSS-REFERENCE TO RELATED APPLICATION

This application claims the benefit of U.S. Provisional Application Ser. No. 61/147,938, filed Jan. 28, 2009, and also the benefit of U.S. Provisional Application Ser. No. 61/226,368, filed Jul. 17, 2009, which are both incorporated herein by reference in their entirety.

BACKGROUND OF THE INVENTION

1. Technical Field

This invention relates generally to dynamic oil seals of the type for creating a fluid tight seal between a rotating shaft and a housing.

2. Related Art

Dynamic radial shaft oil seals are designed to have a so-called "oil side" of the seal and an "air side." These designations pertain to the orientation of the seal when installed, with the oil side facing the interior of the housing and in communication with the oil, whereas the air side faces outwardly and is exposed to the air.

There are at least two different ways in which a radial shaft oil seal can be installed. An "air side installation" is one in which the seal can be first installed into the bore of the housing and the shaft (or its wear sleeve) thereafter installed from the air side axially into the seal assembly (in the direction inward of the housing) to effect the seal. An "oil side installation" is the other where the housing and shaft are already present and the seal assembly is slid axially into the housing and simultaneously onto the shaft (or its wear sleeve), such that the shaft enters the seal assembly from the oil side of the seal. Otherwise, "oil-side" installation requires the seal assembly to be installed into the housing and then the shaft is thereafter inserted through the seal from an "oil-side" of the seal.

During installation, regardless of the type, the seals must be able to withstand the axial loads resulting during installation without causing the lip contact of the seal to reverse fold or otherwise become displaced to a position where the seal lip is ineffective in the fully installed condition.

Radial shaft seals are also subject to varying axial pressures that can be seen during leak testing or in use. The pressure differential developed across the seal (between the oil and air side of the seal) can impart an axial load on the seal in one direction or the other (a vacuum or increased pressure in the housing) and can cause the seal to pull away from the shaft to at least some degree, and in extreme cases can cause the seal to reverse fold and collapse under the pressure so that the seal lip contact is broken.

SUMMARY OF THE INVENTION

In general terms, this invention provides a radial shaft seal assembly having features that facilitate making a proper oil side installation, even in conditions of shaft-to-bore misalignment, and further, provide support for a seal lip of the seal assembly against adverse seal lip contact-breaking movement when exposed to positive or negative pressure on the oil side of the seal assembly when installed.

In accordance with one presently preferred aspect of the invention, a radial shaft seal configured for receipt in a housing and about a shaft to sealingly isolate an air side of the shaft seal from an oil side of the shaft seal is provided. The radial shaft seal includes an annular mounting portion and a seal lip having an annular sealing surface extending between an oil side end and a free air side end, with the sealing surface being configured to extend axially relative to the shaft. Further, an annular bridge is connected to the oil side end of the seal lip by a first hinge and to the mounting portion by a second hinge. The bridge extends from the first hinge to the second hinge in radially overlying relation to the seal lip. An annular projection extends from the mounting portion axially away from the bridge. The projection has an oil side facing the seal lip that is configured to confront the air side end of the seal lip upon the seal lip pivoting about the first hinge toward the projection.

In accordance with another aspect of the invention, a radial shaft seal assembly is provided. The radial shaft seal assembly includes a shaft extending along a central axis and providing a running surface with a predetermined diameter and a radial shaft seal configured for receipt in a housing and about the shaft to sealingly isolate an air side of the radial shaft seal from an oil side of the radial shaft seal. The radial shaft seal includes an annular mounting portion and a seal lip having an annular sealing surface and an opposite backing surface extending between an oil side end and a free air side end, with the sealing surface being configured to extend axially in dynamic sealing contact with the running surface. Further, an annular bridge is attached to the oil side end of the seal lip by a first hinge and to the mounting portion by a second hinge. The bridge extends from the first hinge to the second hinge in radially overlying relation to the seal lip. In addition, an annular projection extends from the mounting portion axially away from the bridge. The projection has an oil side facing the seal lip that is configured to confront the air side end of the seal lip upon the seal lip pivoting about the first hinge toward the projection.

In accordance with another aspect of the invention, a method of installing a radial shaft seal onto a shaft is provided. The method includes providing a shaft having a running surface and providing the radial shaft seal with a seal lip having an annular sealing surface converging from an oil side end to a free air side end while in a free state. Further, providing the radial shaft seal with an annular bridge attached to the oil side end by a first hinge with the bridge diverging to a second hinge while in the free state. The second hinge being attached to an outer mounting portion such that the bridge extends in radially overlying relation with the seal lip. The radial shaft seal further including an annular projection extending from the mounting portion axially away from the bridge, with the projection having an oil side facing the seal lip. Then, bringing the oil side end of the seal lip into abutment with an end of the shaft and causing the air-side end of the seal lip to move into abutment with the oil side of the projection. Further, bringing the sealing surface into sealing engagement with the running surface of the shaft and simultaneously moving the air side end of the seal lip out of abutment with the projection.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
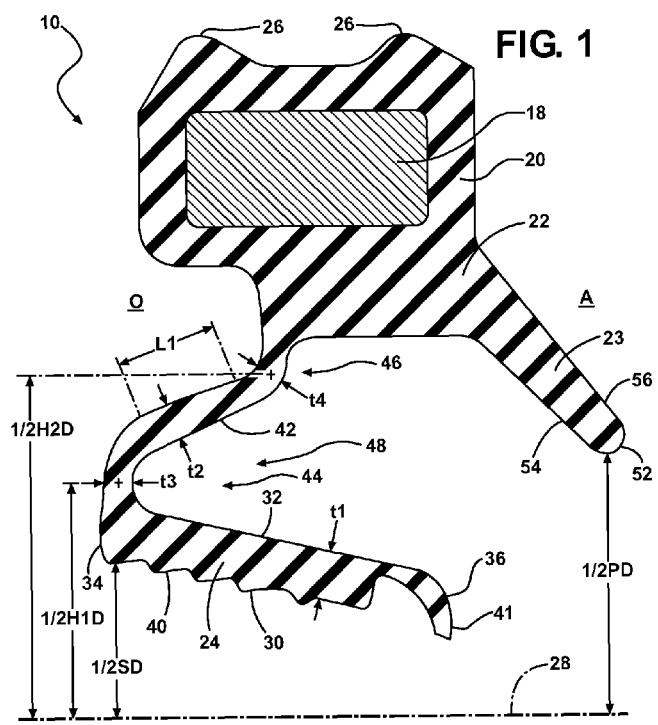
FIG. 1 is a cross-sectional view of a radial shaft seal constructed according to one aspect of the invention.

Referring in more detail to the drawings, FIG. 1 illustrates a radial shaft seal, referred to hereafter as seal 10, constructed in accordance with one aspect of the invention, wherein the seal is suitable for use in a crankcase application, by way of example and without limitation, for sealing about a rotatable shaft 12 in a radial shaft seal assembly 13 (FIGS. 2-4) extending through a bore 14 in the crankcase 16 in which the seal 10 is installed. The seal 10 has an oil side O and an axially opposite air side A, in relation to the orientation of the seal 10 when installed, with the oil side O facing to the interior of the crankcase 16 and the air side A facing to the outside environment. The seal 10 includes a mounting portion, such as a case, also referred to as collar 18, provided as a metal annulus or ring structure with an elastomeric seal material 20 attached thereto. The seal material 20 forms at least part of the an elastomeric seal body 22 with an axially extending seal lip 24 that exhibits low dynamic frictional contact with the shaft 12 during use. The seal 10 has an annular projection 23 extending from the mounting portion 18 to confront the seal lip 24 upon the seal lip pivoting during installation. Accordingly, the projection 23 prevents the seal lip 24 from unfolding axially, and thus, the seal lip 24 is assured of attaining its proper sealing configuration on the shaft 12 upon assembly.

The metal collar 18 may be L-shaped, or may take on any number of configurations, such as C-shaped, S-shaped, or ring shaped, as shown, depending upon the requirements of a particular application, as is know in the art. The metal reinforcing ring structure 18 is shown covered at least in part with the elastomeric seal material 20 on an outer surface which may be contoured with undulations 26 to provide a snug and fluid tight installation in the bore 14 of the crankcase 16. The elastomeric seal material covering 20 forms part of the elastomeric seal body 22 which is molded about the metal collar 18. The core 18 and seal body 22 are relatively rigid, yet the seal material 20 is sufficiently resilient to form the seal lip 24.

The seal lip 24, when in the relaxed, uninstalled state, extends slightly angled by a few degrees, such as between about 1-10 degrees from a horizontal central axis 28 of the seal 10 and has an annular, radially inwardly facing sealing surface 30 and an opposite, radially outwardly facing backing surface 32 extending between an oil side end 34 and a free air side end 36. The sealing surface 30, while in its free state, has a maximum diameter SD at the oil-side end 34 that is less than an outer diameter OD of a running surface 38 of the shaft 12, and thus, the entire sealing surface 30 is assured of being brought into sealing engagement with the running surface 38 in use. The sealing surface 30 can be configured having hydrodynamic features 40 in the form of ribs or a thread, that act to pump oil back to the oil side O of the seal during rotation of the shaft. Further, the air side end 36 can be provided with a dust exclusion lip 41 that facilitates prevention of contamination ingress from the air-side A to the oil-side O of the seal assembly 10, and further, facilitates maintaining the lubricant on the oil-side O of the assembly 10. The seal lip 24 is formed having a predetermined thickness t1 (shown only in FIG. 1 to avoid cluttering the Figures, as with other dimensional features discussed hereafter) to facilitate maintaining the low-torque seal against the shaft 12, as is discussed in more detail below.

An annular bridge 42 operably connects the seal lip 24 to the seal body 22. The annular bridge 42 is connected to the oil side end 34 of the seal lip 24 by a first hinge 44 and to the seal body 22 by a second hinge 46. The bridge 42 extends over a length L1 at an angle to the horizontal central axis 28, such as between about 20-40 degrees, though the angle can range from 1-89 degrees from horizontal. The bridge 42 extends from the first hinge 44 to the second hinge 46 in radially overlying relation to the seal lip 24, and thus, provides an annular pocket 48 facing the air-side A of the seal assembly 10. The bridge 42 is constructed having a thickness t2, while the first and second hinges 44, 46 are constructed having respective thickness t3, t4. The relative thicknesses are preferably such that $t1 \geq t3$; $t2 \geq t3$, and $t2 \geq t4$, and more preferably, $t1 > t3$; $t2 > t3$, and $t2 > t4$. In addition, while in the free state, the first hinge 44 has a first diameter H1D and the second hinge 46 has a second diameter H2D, wherein H1D<H2D.

The seal 10 further includes the annular combination debris exclusion/anti-inversion lip, also referred to the projection 23, that extends generally from the seal body 22 radially inwardly to a free end 52. The projection 23 extends from the seal body 22 axially away from the seal lip 24 and the bridge 42 toward the air side A of the seal 10. The projection 23 has a radially inwardly facing side 54 that faces the oil side O and the seal lip 24 and a radially outwardly facing side 56 that faces the air side A and away from the seal lip 24. The free end 52 has an inner diameter that is greater than the diameter OD of the running surface 38, and thus, the projection 23 is maintained out of contact with the running surface 38 upon assembly and during use. The projection 23, aside from acting as a barrier to the ingress of debris into the oil-side O of the seal 10, is configured to aid in the oil-side installation, discussed further below, to prevent the seal lip 24 and bridge 42 from unfolding during installation. The projection 23 has a thickness extending between the sides 54, 56 that is sufficient to provide a substantially rigid annulus that substantially retains its shape and geometry during installation.

Figure 2:
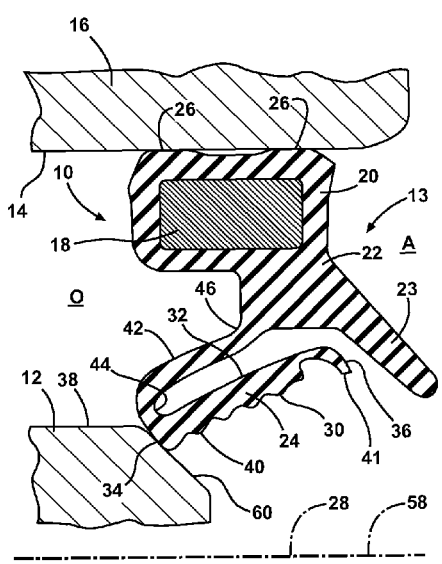
FIG. 2-4 are cross-sectional views of the seal of FIG. 1 shown disposed in a housing with a shaft being installed in progression from an oil-side of the seal.
Figure 3:
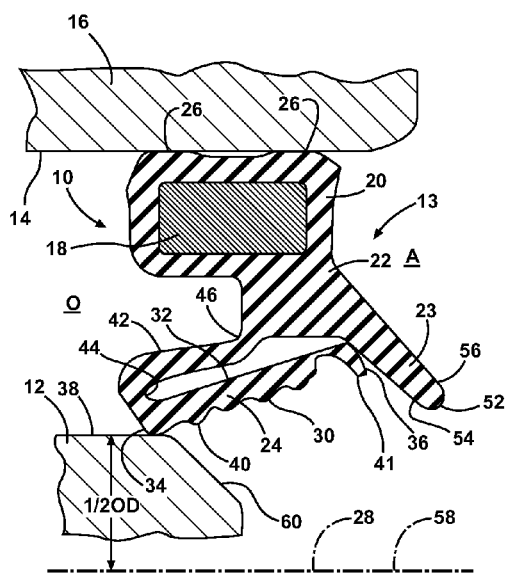
Figure 4:
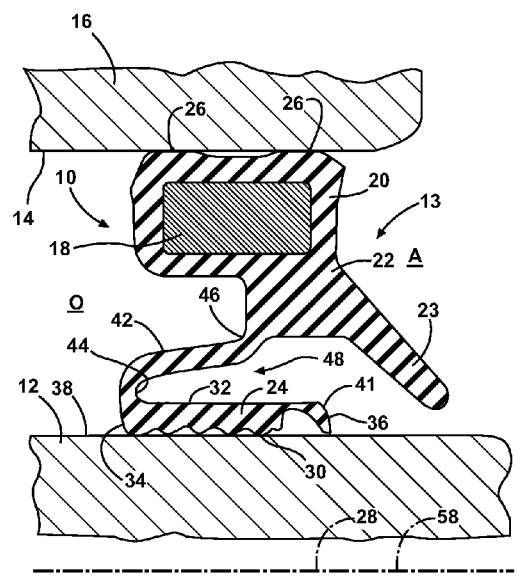

FIGS. 2-4 illustrate an oil-side installation progression of the shaft 12 through the seal 10, wherein a central axis 58 of the shaft 12 is coaxially aligned with the central axis 28 of the seal 10. During installation, the seal 10 is already installed into the housing 16, with the shaft 12 thereafter being extended into the bore 14 and through the seal 10. As the shaft 12 is slid axially into the bore 14, an end 60 of the shaft 12 initially engages the oil side end 34 of the seal 10, and, as this is occurring, the main seal lip 24 is caused to expand radially outwardly and the air-side end 36 of the seal lip 24 is caused to pitch radially outwardly, such that the pocket 48 is caused to partially collapse, thereby reducing the axial installation force required to install the seal 10 about the shaft 12. As the installation progress, as shown in FIG. 3, the air side end 36 continues to move radially outwardly and axially toward the air side A. As a result, the inner side 54 of the projection 23 confronts and rigidly obstructs the air side end 36 of the seal lip 24, thereby preventing the seal lip 24 and the bridge 42 from continuing to move axially toward the air side A of the seal. Accordingly, the projection 23 prevents the seal lip 24 and the bridge 42 from being rolled and inverted axially outwardly toward the air-side A of the seal 10. As such, as shown in FIG. 4, upon full installation of the shaft 12 through the seal 10, the seal lip 24 is able to return radially inwardly to attain its proper sealing configuration with the running surface 38 of the shaft 12.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft to sealingly isolate an air side of the shaft seal from an oil side of the shaft seal, comprising:
    an annular rigid mounting portion;
    an elastomeric material bonded to said rigid mounting portion, said elastomeric material forming a seal body including a seal lip spaced radially inwardly from said rigid mounting portion, said seal lip having an annular sealing surface extending between an oil side end and a free air side end, said sealing surface being configured to extend axially relative to the shaft;
    an annular bridge connected to said oil side end of said seal lip by a first hinge and to said mounting portion by a second hinge, said bridge extending radially outwardly from said first hinge to said second hinge in radially overlying relation to said seal lip; and
    an annular projection molded from said elastomeric material as an extension of said seal body, said annular projection extending radially inwardly from said rigid mounting portion and extending axially away from said bridge toward the air side of said radial shaft seal to a free end, said projection having an oil side facing said seal lip and being configured to confront said free air side end of said seal lip upon said seal lip pivoting about said first hinge toward said projection.

2. The radial shaft seal of claim 1 wherein said free end of said annular projection has a diameter greater than said seal lip.

3. The radial shaft seal of claim 1 wherein said first hinge has a thickness and said seal lip has a thickness that is greater than said thickness of said first hinge.

4. The radial shaft seal of claim 3 wherein said bridge has a thickness that is greater than said thickness of said first hinge.

5. The radial shaft seal of claim 4 wherein said thickness of said seal lip is greater than said thickness of said bridge.

6. The radial shaft seal of claim 5 wherein said thickness of said bridge is greater than said thickness of said second hinge.

7. The radial shaft seal of claim 1 wherein said bridge has a thickness that is greater than said thickness of said second hinge.

8. The radial shaft seal of claim 7 wherein said bridge has a thickness that is greater than said thickness of said first hinge.

9. The radial shaft seal of claim 7 wherein said seal lip has a thickness that is greater than said thickness of said second hinge.

10. The radial shaft seal of claim 7 wherein said seal lip has a thickness that is greater than said thickness of said bridge.

11. The radial shaft seal of claim 1 wherein said first hinge extends between said seal lip and said projection.

12. A radial shaft seal assembly, comprising:
    a shaft extending along a central axis and providing a running surface with a predetermined diameter; and
    a radial shaft seal configured for receipt in a housing and about said shaft to sealingly isolate an air side of the radial shaft seal from an oil side of the radial shaft seal, comprising:
    an annular rigid mounting portion;
    an elastomeric material bonded to said rigid mounting portion, said elastomeric material forming a seal body including a seal lip spaced radially inwardly from said rigid mounting portion, said seal lip having an annular sealing surface extending between an oil side end and a free air side end, said sealing surface being configured to extend axially in dynamic sealing contact with said running surface;
    an annular bridge connected to said oil side end of said seal lip by a first hinge and to said mounting portion by a second hinge, said bridge extending from said first hinge to said second hinge in radially overlying relation to said seal lip; and
    an annular projection molded from said elastomeric material as an extension of said seal body, said annular projection extending radially inwardly from said rigid mounting portion and extending axially away from said bridge toward the air side of said radial shaft seal and toward said running surface to a free end, said projection having an oil side facing said seal lip configured to confront said air side end of said seal lip upon said seal lip pivoting about said second hinge toward said projection.

13. The radial shaft seal assembly of claim 12 wherein said free end of said annular projection has a diameter greater than said shaft.

14. The radial shaft seal assembly of claim 13 wherein said first hinge has a thickness, said seal lip and said bridge having a thickness that is greater than said thickness of said first hinge.

15. A method of installing a radial shaft seal onto a shaft, comprising:
    providing a shaft having a running surface;
    providing the radial shaft seal with a seal lip having an annular sealing surface converging radially inwardly from an oil side end to a free air side end while in a free state with an annular bridge attached to the oil side end by a first hinge and diverging radially outwardly to a second hinge while in the free state, the second hinge being attached to an outer mounting portion such that the bridge extends in radially overlying relation with the seal lip, the seal further including an annular projection extending radially inwardly from the mounting portion and extending axially away from the bridge toward an air side of the seal, the projection having an oil side facing the seal lip;
    moving the shaft and the radial shaft seal axially toward one another;
    bringing the oil side end of the seal lip into abutment with an end of the shaft and causing the air-side end of the seal lip to move into abutment with the oil side of the projection; and
    bringing the sealing surface into sealing engagement with the running surface and simultaneously moving the air side end of the seal lip out of abutment with the projection.

16. The method of claim 15 further including providing the projection with a predetermined length extending to a free end having a diameter greater than a diameter of the running surface.

17. The method of claim 16 further including causing the sealing surface to pivot at least in part via the first hinge from the converging configuration to a diverging configuration.

* * * * *